(12) United States Patent
Matsuno et al.

(10) Patent No.: US 7,556,887 B2
(45) Date of Patent: Jul. 7, 2009

(54) NONAQUEOUS ELECTROLYTE SECONDARY BATTERY WITH NEGATIVE ELECTRODE HAVING A $LA_3CO_2SN_7$ TYPE CRYSTAL STRUCTURE

(75) Inventors: Shinsuke Matsuno, Kashiwa (JP); Tatsuoki Kohno, Tokyo (JP); Takao Sawa, Yokohama (JP); Fumiyuki Kawashima, Matsudo (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 902 days.

(21) Appl. No.: 11/012,189

(22) Filed: Dec. 16, 2004

(65) Prior Publication Data
US 2005/0214643 A1    Sep. 29, 2005

(30) Foreign Application Priority Data
Mar. 23, 2004  (JP)  .............................. 2004-084498
Nov. 26, 2004  (JP)  .............................. 2004-342420

(51) Int. Cl.
*H01M 4/58*    (2006.01)
*H01M 4/00*    (2006.01)

(52) U.S. Cl. ................. 429/218.1; 429/231.5; 429/220; 429/223; 429/224; 429/231.6

(58) Field of Classification Search ........................ None
See application file for complete search history.

(56) References Cited

U.S. PATENT DOCUMENTS 5,916,707 A * 6/1999 Omaru et al. ................ 429/163
6,949,312 B1 * 9/2005 Kawakami et al. ....... 429/218.1
2005/0214643 A1    9/2005 Matsuno et al.

FOREIGN PATENT DOCUMENTS

| JP | 10-223221 | 8/1998 |
|---|---|---|
| JP | 2001-250541 | 9/2001 |
| JP | 2003-86176 | 3/2003 |
| JP | 2003-197188 | 7/2003 |
| JP | 2003-346793 | 12/2003 |
| JP | 2004-79463 | 3/2004 |
| JP | 2006-120324 | 5/2006 |
| KR | 2001-0032228 | 4/2001 |
| WO | WO 00/17948 | 3/2000 |

OTHER PUBLICATIONS

U.S. Appl. No. 11/509,754, filed Aug. 25, 2006, Matsuno et al.
U.S. Appl. No. 11/282,837, filed Nov. 21, 2005, Matsuno et al.
U.S. Appl. No. 11/432,402, filed May 12, 2006, Matsuno et al.

* cited by examiner

*Primary Examiner*—Dah-Wei D Yuan
*Assistant Examiner*—Kwang Han
(74) *Attorney, Agent, or Firm*—Oblon, Spivak, McClelland, Maier & Neustadt, P.C.

(57) ABSTRACT

A nonaqueous electrolyte secondary battery includes a case, a nonaqueous electrolyte provided in the case, a positive electrode provided in the case and capable of absorbing-releasing Li, and a negative electrode provided in the case and containing an alloy that has a $La_3Co_2Sn_7$ type crystal structure.

19 Claims, 5 Drawing Sheets

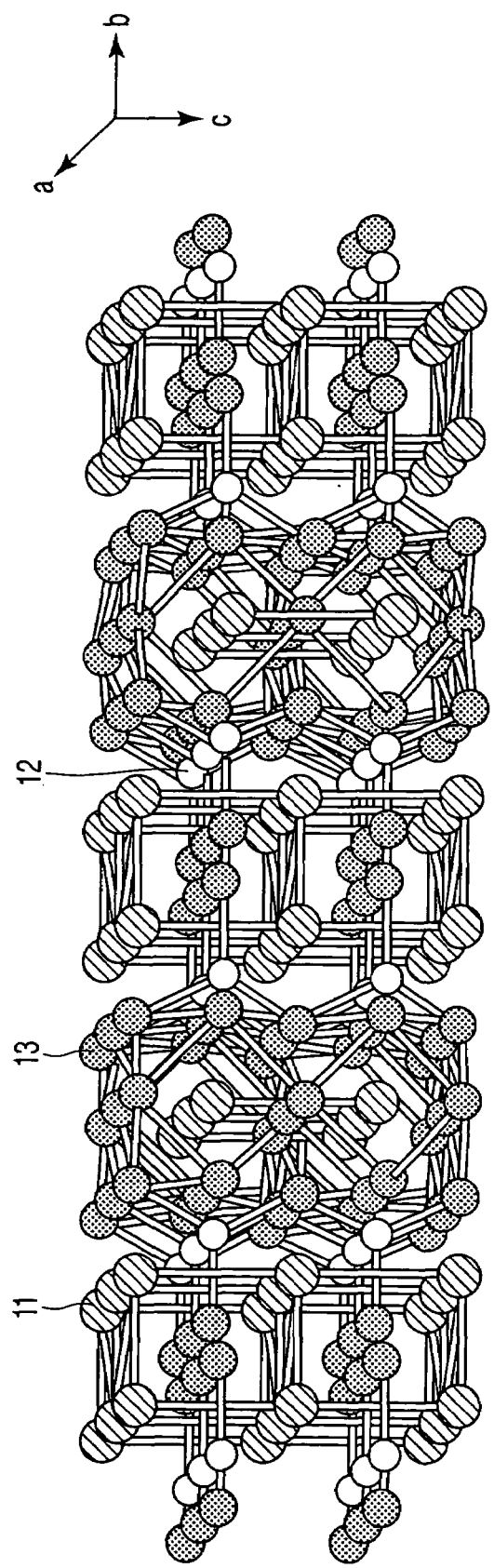
F I G. 2

NONAQUEOUS ELECTROLYTE SECONDARY BATTERY WITH NEGATIVE ELECTRODE HAVING A $La_3Co_2Sn_7$ TYPE CRYSTAL STRUCTURE

CROSS-REFERENCE TO RELATED APPLICATIONS

This application is based upon and claims the benefit of priority from prior Japanese Patent Applications No. 2004-084498, filed Mar. 23, 2004; and No. 2004-342420, filed Nov. 26, 2004, the entire contents of both of which are incorporated herein by reference.

BACKGROUND OF THE INVENTION

1. Field of the Invention

The present invention relates to a nonaqueous electrolyte secondary battery.

2. Description of the Related Art

The development of a nonaqueous electrolyte secondary battery, in which the charge-discharge is carried out by the migration of the Li ions between the negative electrode and the positive electrode, is being carried out vigorously as a battery of a high energy density. It is desirable for the negative electrode active material used in the nonaqueous electrolyte secondary battery to have a large capacity and a long cycle life.

A carbonaceous material is used nowadays as the negative electrode active material. The carbonaceous material has a long cycle life because the Li absorption-release reaction is carried out by the reversible intercalation reaction. However, the carbonaceous material is small in its Li absorption amount so as to give rise to the problem that the capacity of the carbonaceous material is small.

Such being the situation, metals and alloys, which are expected to exhibit a large capacity, are being studied as the negative electrode active material.

The metals such as Al, Si, Ge, Sn and Sb, which exhibit a high reactivity with Li, were studied as the negative electrode active material. However, in the case of these metals, the Li absorbing-releasing reaction is carried out by the alloying reaction, leading to a short cycle life. It should be noted in this connection that the negative electrode active material is repeatedly subjected to the change in crystal structure and to the expansion-shrinkage in accordance with progress of the alloying reaction. As a result, the negative electrode active material is finely pulverized so as to decrease the amount of Li contributing to the charge-discharge of the secondary battery. Such being the situation, the cycle life of the negative electrode active material is shortened as pointed out above.

The alloy materials having a specified composition including a rare earth element and Sn, which are manufactured by the process including the melting step, the cooling step and the heat treating step that are carried out under specified conditions, are proposed as the alloys effective for forming the negative electrode active material in Japanese Patent Disclosure (Kokai) No. 2003-197188. This patent document refers to, for example, $CeSn_3$ as a binary alloy and to $La_{0.6}Co_{0.4}Sn_3$ as a ternary alloy.

However, the Li absorbing-releasing reaction carried out by the alloys disclosed in the patent document referred to above is provided by the alloying reaction. As a result, it was impossible for the negative electrode active material formed of the particular alloys to exhibit a long cycle life.

BRIEF SUMMARY OF THE INVENTION

An object of the present invention is to provide a nonaqueous electrolyte secondary battery comprising a negative electrode active material that contains an alloy material and having a long cycle life.

According to a first aspect of the present invention, there is provided a nonaqueous electrolyte secondary battery, comprising:
a case;
a nonaqueous electrolyte provided in the case;
a positive electrode provided in the case and capable of absorbing-releasing Li; and
a negative electrode provided in the case and containing an alloy that has a $La_3Co_2Sn_7$ type crystal structure.

According to a second aspect of the present invention, there is provided a nonaqueous electrolyte secondary battery, comprising:
a case;
a nonaqueous electrolyte provided in the case;
a positive electrode provided in the case and capable of absorbing-releasing Li;
a negative electrode provided in the case and containing an alloy that has a $La_3Co_2Sn_7$ type crystal structure; and
a separator provided between the negative electrode and the positive electrode and holding the nonaqueous electrolyte.

BRIEF DESCRIPTION OF THE SEVERAL VIEWS OF THE DRAWING

FIG. 2 schematically shows the $La_3Co_2Sn_7$ type crystal structure;

DETAILED DESCRIPTION OF THE INVENTION

Figure 1:
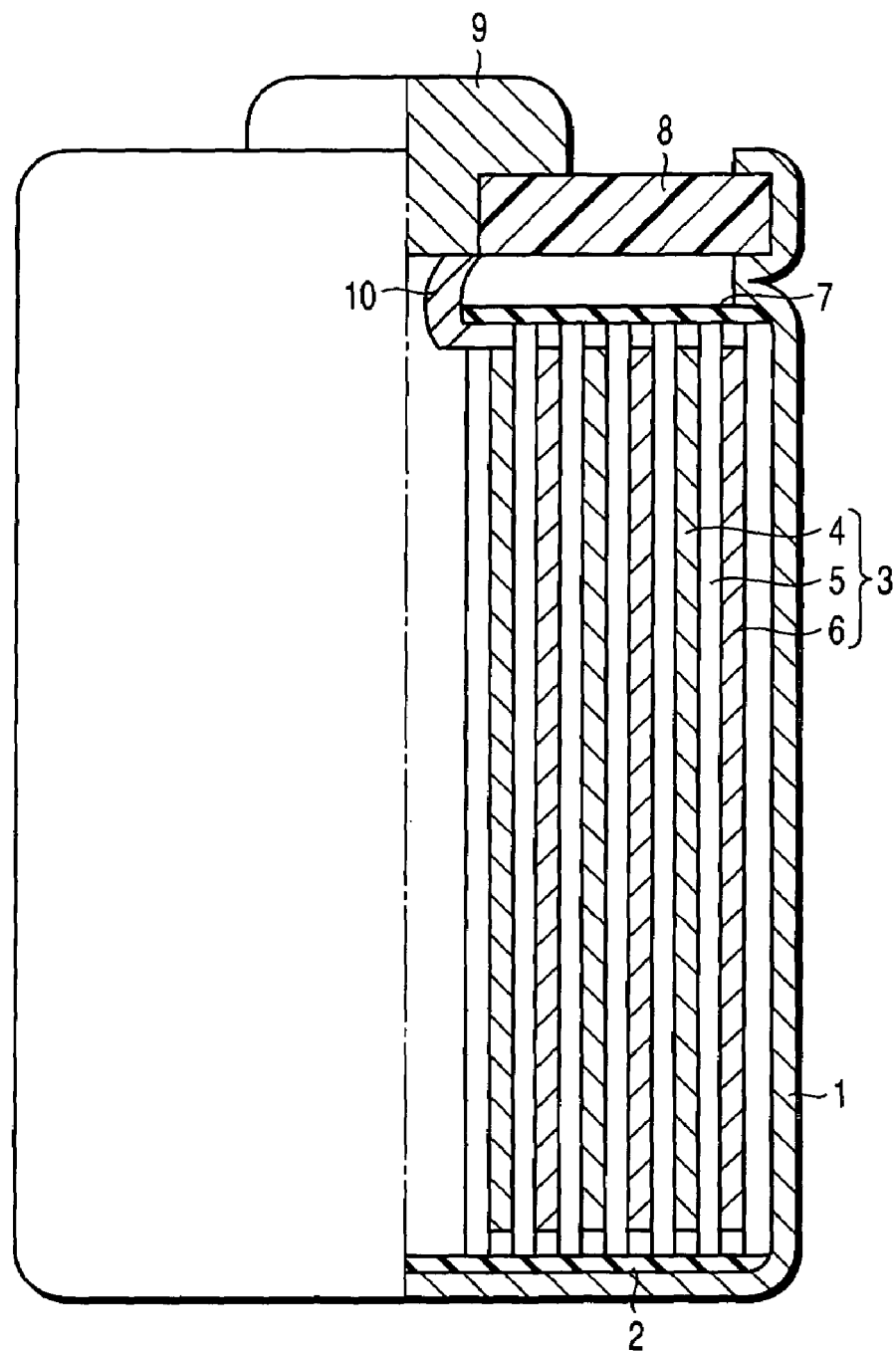
FIG. 1 is a cross sectional view, partly broken away, schematically showing the construction of a cylindrical nonaqueous electrolyte secondary battery according to a first embodiment of the present invention.

As a result of an extensive research, the present inventors have found that the nonaqueous electrolyte secondary battery comprising a negative electrode containing an alloy having the $La_3Co_2Sn_7$ type crystal structure permits increasing the discharge capacity per unit volume, compared with a nonaqueous electrolyte secondary battery comprising an negative electrode containing a carbonaceous material as the negative electrode active material. It has also been found that the nonaqueous electrolyte secondary battery comprising a negative electrode containing an alloy having the $La_3Co_2Sn_7$ type crystal structure makes it possible to realize the charge-discharge cycle life close to that of the nonaqueous electrolyte secondary battery comprising an negative electrode containing a carbonaceous material as the negative electrode active material.

The negative electrode, the positive electrode, and the nonaqueous electrolyte included in the nonaqueous electrolyte secondary battery of one embodiment of the present invention will now be described.

1) Negative Electrode:

The negative electrode includes a current collector and a negative electrode active material supported by the current collector.

The negative electrode active material contains at least a ternary alloy having a specified crystal structure, i.e., an alloy having the $La_3Co_2Sn_7$ type crystal structure.

FIG. 2 schematically shows the $La_3Co_2Sn_7$ type crystal structure. As shown in FIG. 2, atoms 11 corresponding to La are hatched by oblique lines, atoms 12 corresponding to Co are denoted by white circles, and atoms 13 corresponding to Sn are denoted by dotted patterns.

In the alloy having the $La_3Co_2Sn_7$ type crystal structure, the Li absorption-release is carried by the intercalation reaction so as to make it possible to obtain a long life.

As described herein later, it has been confirmed by using an X-ray diffraction pattern that the Li absorption-release is carried out by the intercalation reaction in the alloy having the $La_3Co_2Sn_7$ type crystal structure. Also, as described herein later, it was impossible for the alloy formed of the similar constituting elements to exhibit a long life in the case where the alloy differed in the component ratio from the alloy of the $La_3Co_2Sn_7$ type crystal structure. Such being the situation, it is considered reasonable to understand that the long cycle life is derived from the $La_3Co_2Sn_7$ type crystal structure.

Also, the distance between the adjacent layers of the crystal planes in any of the b-axis direction and the c-axis direction is longer than that in the a-axis direction, and Li is considered to be inserted into and released from the alloy through the space between the adjacent layers of the crystal planes defined by the b-axis and the c-axis of the crystal.

In the alloy of the $La_3Co_2Sn_7$ type crystal structure, the Li absorption-release can be performed by the intercalation reaction. It is considered reasonable to understand that the reasons for the capability of the Li absorption-release by the intercalation reaction are as follows.

As shown in FIG. 2, $LaSn_3$ units are included in the $La_3Co_2Sn_7$ type crystal structure. The $LaSn_3$ unit exhibits a high affinity for lithium and, thus, tends to carry out an alloying reaction with lithium in the absorbing stage of lithium. Such being the situation, in the alloy consisting of the $LaSn_3$ phase formed of the $LaSn_3$ units, the lithium releasing amount is decreased with progress of the absorption-release reaction of lithium so as to collapse the crystal structure. In the $La_3Co_2Sn_7$ type crystal structure, however, the Co atom coupled with the Sn atom included in the $LaSn_3$ unit serves to suppress the change in the crystal structure in the stage of releasing lithium. As a result, it is possible to carry out the absorption-release reaction of lithium while maintaining the crystal structure. In other words, the absorption-release of lithium can be carried out by the intercalation reaction.

Under the circumstances, it is possible to suppress the collapse of the crystal structure of the alloy and to suppress the decrease of the discharge capacity so as to make it possible to improve the charge-discharge cycle life of the secondary battery. Incidentally, it has been clarified as a result of the research conducted by the present inventors that cobalt is superior to nickel in the effect of suppressing the change in the crystal structure, and that nickel is more advantageous in the function of performing the smooth intercalation reaction.

It is desirable for the alloy of the $La_3Co_2Sn_7$ type crystal structure to have a composition represented by formula (1) given below:

$$Ln_3M1_xM2_y \qquad (1)$$

where Ln denotes at least one kind of the element selected from the elements having the atomic radius falling within a range of from $1.6\times10^{-10}$ m to $2.2\times10^{-10}$ m, M1 is at least one kind of the element selected from the group consisting of Ti, V, Cr, Mn, Fe, Co, Ni, Cu, Zn and Nb, M2 is at least one kind of the element selected from the group consisting of Si, P, Ge, Sn and Sb, x is $1.2 \leq x \leq 3.5$, and y is $6.0 \leq y \leq 8.0$.

Incidentally, it is desirable for the alloy to be of a single phase structure consisting of the $La_3Co_2Sn_7$ type crystal structure. However, it is possible for the alloy to contain a phase other than the phase of the $La_3Co_2Sn_7$ type crystal structure. Whether the alloy is of a single phase structure or of a multi-phase structure, it is desirable for the alloy to have the $La_3Co_2Sn_7$ type crystal structure as the main phase. Incidentally, the term "main phase" noted above implies the phase having the highest ratio of the presence in the alloy.

It is possible for Ln included in formula (1) given above, which denotes the element defined in terms of the atomic radius as described above, to contribute to the stabilization of the $La_3Co_2Sn_7$ type crystal structure. Particularly, the component Ln gives a big influence to the crystal lattice.

The lattice constant of each of the b-axis and the c-axis is enlarged in the component Ln with increase in the atomic radius within the range given above so as to make it possible to promote the absorption-release reaction of lithium. It follows that it is possible for the component Ln to contribute to the rapid charging properties and to the high rate discharge properties of the secondary battery. Also, if the atomic radius of the component Ln is small within the range given above, it is possible for the component Ln to contribute to the increase in the capacity of the secondary battery.

It is desirable for the component Ln to be a mixture of atoms having a large atomic radius and atoms having a small atomic radius. If the mixing ratio of the atoms having a large atomic radius and the atoms having a small atomic radius is controlled appropriately, it is possible to improve the rapid charging properties and the high rate discharge properties of the secondary battery and, at the same time, to provide a secondary battery of a high capacity.

It is desirable for the component Ln to include, for example, La having an atomic radius of $1.88\times10^{-10}$ m, Ce having an atomic radius of $1.83\times10^{-10}$ m, Pr having an atomic radius of $1.83\times10^{-10}$ m, Nd having an atomic radius of $1.82\times10^{-10}$ m, Pm having an atomic radius of $1.80\times10^{-10}$ m, Sm having an atomic radius of $1.79\times10^{-10}$ m, Mg having an atomic radius of $1.60\times10^{-10}$ m, Ca having an atomic radius of $1.97\times10^{-10}$ m, Sr having an atomic radius of $2.15\times10^{-10}$ m, Ba having an atomic radius of $2.18\times10^{-10}$ m, Y having an atomic radius of $1.82\times10^{-10}$ m, Zr having an atomic radius of $1.62\times10^{-10}$ m, and Hf having an atomic radius of $1.60\times10^{-10}$ m.

It is possible for the component M1 to contribute to the stabilization of the $La_3Co_2Sn_7$ type crystal structure.

In view of the stabilization of the crystal structure, it is desirable for the component ratio x of the component M1 to fall within a range of from 1.2 to 3.5, more preferably from 1.5 to 3.0.

If the component ratio x of the component M1 is higher than 3.5, formation of the sub-phase other than the phase of the $La_3Co_2Sn_7$ type crystal structure is increased. On the other hand, if the component ratio x of the component M1 is lower than 1.2, formed is a phase, e.g., a LnSn phase, performing an alloying reaction with Li so as to markedly shorten the cycle life of the secondary battery.

If the component ratio x is low within the range given above, the component M1 contributes to the increase in the capacity of the negative electrode active material. Also, if the component ratio x is high within the range given above, the component M1 contributes to the stabilization of the crystal structure. These effects are produced because the lack of the component M1 permits enlarging the region within which Li is capable of being present with a high stability.

The component M2 is formed of atoms having a high reactivity with Li and, thus, contributes to the increase in the capacity of the negative electrode active material.

In order to suppress the formation of a sub-phase other than the phase of the $La_3Co_2Sn_7$ type crystal structure, it is desirable for the component ratio y of the component M2 to fall within a range of from 6.0 to 8.0, more desirably from 6.5 to 7.8.

If the component ratio y of the component M2 is higher than 8.0, formed is a phase, e.g., a LnSn phase, performing an alloying reaction with Li so as to markedly shorten the life of the negative electrode active material. On the other hand, if the component ratio y of the component M2 is lower than 6.0, formation of the sub-phase other than the phase of the $La_3Co_2Sn_7$ type crystal structure is increased.

If the component ratio y of the component M2 is high within the range given above, it is possible to increase the capacity of the negative electrode active material.

The alloy having the phase of the $La_3Co_2Sn_7$ type crystal structure is manufactured by the method of, for example, melting the alloy components under high temperatures, followed by rapidly cooling the melt. In other words, the particular alloy noted above is manufactured by the melting-rapid cooling method. In this case, it is desirable for the alloy represented by formula (1) given previously to comprise Ni and/or Co (hereinafter referred to as the first element) constituting the component M1 in an amount falling within a range of from 40 atomic % to 100 atomic % based on the amount of the component M1, and Sn and/or Si (hereinafter referred to as the second element) constituting the component M2 in an amount falling within a range of from 50 atomic % to 100 atomic % based on the amount of the component M2. In this case, it is possible to obtain an alloy having the $La_3Co_2Sn_7$ type crystal phase as the main phase. Further, if the component Ln in this composition includes La, it is possible to increase the stability of the phase of the $La_3Co_2Sn_7$ type crystal structure.

Where the ratio of the first element (Ni and/or Co) is 100 atomic % of the component M1 and the ratio the second element (Sn and/or Si) is 100 atomic % of the component M2, the formation of the $La_3Co_2Sn_7$ type crystal structure can be most facilitated. However, even where the ratio of the first element is lower than 100 atomic % of the component M1 or even where the ratio of the second element is lower than 100 atomic % of the component M2, it is possible for element A and element B to be contained in the $La_3Co_2Sn_7$ type crystal lattice in a manner to form a solid solution, if the alloy has the aforementioned composition and is manufactured by the melting-rapid cooling method under the conditions described in the following. It follows that it is possible to obtain an alloy containing the $La_3Co_2Sn_7$ type crystal phase as the main phase even if the alloy contains element A and/or element B. Incidentally, element A noted above denotes the element of the component M1 other than the first element referred to above, and element B noted above denotes the element of the component M2 other than the second element referred above. Element A referred to above corresponds to Ti, V, Cr, Mn, Fe, Cu, Zn and Nb. It is desirable to use Ti, V and Fe as the element A in view of the improvements in the capacity of the negative electrode active material and in the charge-discharge cycle life of the secondary battery. On the other hand, element B referred to above corresponds to P, Ge and Sb. It is desirable to use Ge and Sb as the element B in view of the improvements in the capacity of the negative electrode active material and in the charge-discharge cycle life of the secondary battery.

The melting-rapid cooling method will now be described.

In the melting step, the metal raw materials of the desired elements, which are weighed in advance, are melted under temperatures higher than the melting point of the alloy within a crucible that is put under an inert atmosphere such as an Ar gas atmosphere. An induction furnace is employed in the case of manufacturing an alloy having a low melting point. On the other hand, an arc furnace is employed in the case of manufacturing an alloy having a high melting point. It is desirable for the metal raw materials to be melted under temperatures higher than the melting point of the alloy by 50° C. to 300° C., more desirably by 100° C. to 200° C., though the temperature for melting the metal raw materials depends on the composition of the metal raw materials. On the other hand, the melting time should fall within a range of from 1 minute to 30 minutes, preferably from about 3 minutes to 10 minutes.

The rapid cooling step is carried out by employing, for example, a rapid quenched method, a strip casting method or an atomizing method.

In the rapid quenched method, an alloy melt is sprayed against a drum type cooling body that is rotated at a high speed so as to obtain flake-like alloy materials having a thickness falling within a range of from about 10 μm to 50 μm. It is possible to obtain the flake-like alloy materials having a thickness increased up to 100 μm by suppressing the rotating speed of the cooling plate. The thickness of the flake-like alloy material can be controlled by controlling the supply rate of the melt, and the cooling rate can be controlled by controlling the rotating speed of the cooling body.

In the strip casting method, the supply amount of the melt to the cooling body per unit time is larger than that in the rapid quenched method, and it is possible for the strip casting method to produce ribbon-shaped alloy materials having a thickness falling within a range of from about 100 μm to about 500 μm. In the case of employing the strip casting method, it is possible to obtain easily the columnar crystal texture having a long life.

In the atomizing method, a high pressure water or a high pressure gas is blown against an alloy melt so as to scatter the alloy melt in the form of a mist. The alloy melt in the form of the mist is classified in the atomizing method. In the water atomizing method, it is possible to obtain a sample of foreign shapes. On the other hand, it is possible to obtain uniform spherical alloy materials having a diameter falling within a range of from about 10 μm to about 100 μm.

The alloy materials thus obtained can be made homogenous in texture and composition by a heat treatment. The effects by the heat treatment can be produced prominently when it comes to the alloy materials prepared by employing a high rapid cooling rate.

The heat treatment is carried out under an inert atmosphere such as an Ar gas atmosphere or under vacuum. It is desirable for the heat treatment to be carried out under the temperature falling within a range of from 400° C. to 900° C., more desirably from 600° C. to 800° C. Also, it is desirable for the heat treating time to fall within a range of from 30 minutes to one day, more desirably from about 8 hours to 12 hours.

Where an alloy material having the $La_3Co_2Sn_7$ type crystal structure is used as a negative electrode active material, it is considered to be used a granular alloy material or a thin plate-shaped alloy material.

The following description covers first the case where a granular alloy material is used as a negative electrode active material.

In the case of using a granular alloy material, it is desirable for the alloy material to be as uniform in shape as possible in order to make uniform the load imparted to the other battery materials. In the case of employing a method other than the gas atomizing method for manufacturing the alloy material, the manufactured alloy material is not uniform. Therefore, it is desirable to apply a pulverizing treatment to the manufactured alloy material. The pulverizing treatment is carried out by using a pulverizer such as a ball mill or a jet mill.

The method of manufacturing the negative electrode will now be described.

Where a granular alloy material is used as a negative electrode active material, the granular alloy material is suspended in an appropriate solvent together with, for example, other negative electrode active materials, an electrically conductive agent and a binder so as to prepare a slurry. Then, one surface or both surfaces of a current collector are coated with the slurry thus obtained, followed by drying the coated slurry so as to obtain the negative electrode.

The other negative electrode active materials noted above include, for example, a carbonaceous material having a high Li absorbing capability.

The mixing amount of the carbonaceous material having a high Li absorbing capability, which is dependent on the positive electrode material and the required properties of the battery such as the weight and the capacity, can be falling within a range of from 3% by weight to 90% by weight. It is more desirable for the mixing amount of the carbonaceous material noted above to fall within a range of from 40% by weight to 60% by weight in view of the manufacturing method of the negative electrode. Where the mixing amount of the carbonaceous material falls within the range noted above, the negative electrode active material, the electrically conductive agent and the binder can be mixed sufficiently so as to facilitate the coating of the current collector with the negative electrode active material.

It is desirable to use a graphitized material as the carbonaceous material having a high Li absorbing capability. For example, it is desirable to use mesophase pitch carbon fiber (MCF) and mesophase pitch carbon micro beads (MCMB) as the carbonaceous material having a high Li absorbing capability.

In order to improve the electron conductivity, it is desirable to use a carbonaceous material having a high electrical conductivity as the electrically conductive agent serving to suppress the contact resistance with the current collector. For example, it is desirable to use an acetylene black or a carbon black as the electrically conductive agent.

The binder used in the present invention for the bonding between the negative electrode active material and the electrically conductive agent includes, for example, polytetrafluoroethylene (PTFE), polyvinylidene fluoride (PVdF), a fluorinated rubber, an ethylene-butadiene rubber (SBR), and a carboxy methyl cellulose (CMC).

It is desirable for the mixing amount of the negative electrode active material to fall within a range of from 70% by weight to 95% by weight. It is desirable for the mixing amount of the electrically conductive agent to be not larger than 25% by weight. Further, it is desirable for the mixing amount of the binder to fall within a range of from 2% by weight to 10% by weight.

Where the mixing amount of the electrically conductive agent is not larger than 25% by weight, it is possible to suppress the decomposition of the nonaqueous electrolyte on the surface of the electrically conductive agent during storage of the nonaqueous electrolyte secondary battery under high temperatures. When it comes to the binder, a sufficiently high electrode strength can be obtained, if the mixing amount of the binder is not smaller than 2% by weight. Also, it is possible to decrease the amount of the insulating material contained in the electrode by setting the upper limit of the binder content at 10% by weight.

As described previously, a thin plate-like alloy material can also be used as the negative electrode active material.

In the case of using a thin plate-like alloy material as the negative electrode active material, the negative electrode can be manufactured by, for example, forming a thin plate-like alloy material layer directly on the current collector. Incidentally, in the case of using the thin plate-like alloy material, it is possible to attach a negative electrode terminal directly to the thin plate-like alloy material layer without using a current collector.

The current collector includes, for example, a foil, a mesh, a punched metal and a lath metal each formed of an electrically conductive material including, for example, copper, stainless steel and nickel.

2) Positive Electrode

The positive electrode is manufactured by preparing first a slurry by suspending a positive electrode active material, an electrically conductive agent, and a binder in a suitable solvent, followed by coating one surface or both surfaces of a current collector such as an aluminum foil with the slurry thus prepared and subsequently drying the coated slurry and, then, pressing the current collector coated with the slurry so as to obtain a band-like electrode.

The positive electrode active material includes, for example, an oxide and a polymer. The oxide used as the positive electrode active material includes, for example, manganese dioxide ($MnO_2$) containing a Li salt, iron oxide, copper oxide, nickel oxide, iron sulfate ($Fe_2(SO_4)_3$), a vanadium oxide such as $V_2O_5$, lithium-manganese complex oxides such as $Li_xMn_2O_4$ and $Li_xMnO_2$, lithium-nickel complex oxides such as $Li_xNiO_2$, lithium-cobalt complex oxides such as $Li_xCoO_2$, lithium-nickel-cobalt oxides such as $LiNi_{1-y}Co_yO_2$, lithium-manganese-cobalt oxides such as $LiMn_yCo_{1-y}O_2$, Spinel type lithium-manganese-nickel oxides such as $Li_xMn_{2-y}Ni_yO_4$, and lithium phosphates having an olivine structure such as $Li_xFePO_4$, $Li_xFe_{1-y}Mn_yPO_4$, and $Li_xCoPO_4$.

On the other hand, the polymer used in the present invention as the positive electrode active material includes, for example, electrically conductive polymer materials such as polyaniline and polypyrrole and disulfide series polymer materials.

It is desirable for the positive electrode active material to be selected from the group consisting of, for example, a lithium-manganese complex oxide such as $Li_xMn_2O_4$, a lithium-nickel complex oxide such as $Li_xNiO_2$, a lithium-cobalt complex oxide such as $Li_xCoO_2$, a lithium-nickel-cobalt complex oxide such as $Li_xNi_{1-y}Co_yO_2$, a Spinel type lithium-manganese-nickel complex oxide such as $Li_xMn_{2-y}Ni_yO_4$, a lithium-manganese-cobalt complex oxide such as $Li_xMn_yCo_{1-y}O_2$, and a Fe-containing lithium phosphate such as $Li_xFePO_4$. In the case of using any of these positive electrode active materials, it is possible to obtain a high positive electrode voltage. Incidentally, it is desirable for the values of x and y to satisfy $0 \leq x \leq 1$, $0 \leq y \leq 1$.

The electrically conductive agent includes, for example, an acetylene black, a carbon black, and graphite.

On the other hand, the binder includes, for example, polytetrafluoroethylene (PTFE), polyvinylidene fluoride (PVdF), and a fluorinated rubber.

The positive electrode active material, the electrically conductive agent and the binder can be mixed in a suitable mixing ratio. It is desirable for the mixing amount of the positive electrode active material to fall within a range of from 80% by weight to 95% by weight. It is desirable for the mixing amount of the electrically conductive agent to fall within a range of from 3% by weight to 18% by weight. Further, it is desirable for the mixing amount of the binder to fall within a range of from 2% by weight to 7% by weight. Where the mixing amount of the electrically conductive agent is not smaller than 3% by weight, it is possible to improve the electron conductivity so as to suppress the contact resistance with the current collector. On the other hand, where the mixing amount of the electrically conductive agent is not larger than 18% by weight, it is possible to suppress the decomposition of the nonaqueous electrolyte on the surface of the electrically conductive agent during the storage of the secondary battery under high temperatures. Further, where the mixing amount of the binder is not smaller than 2% by weight, it is possible to obtain a sufficiently high electrode strength. On the other hand, where the mixing amount of the binder is not larger than 7% by weight, it is possible to decrease the amount of the insulating materials contained in the electrode.

3) Nonaqueous Electrolyte

The nonaqueous electrolyte used in the present invention includes, for example, a liquid electrolyte, a gel-like electrolyte containing a polymer, a solid electrolyte containing a polymer, and an inorganic solid electrolyte.

The liquid electrolyte can be prepared by, for example, dissolving an electrolyte in an nonaqueous solvent. It is desirable for the concentration of the electrolyte to fall within a range of from 0.5 to 2 mol/L. The gel-like electrolyte can be prepared by, for example, forming a composite material consisting of an electrolyte, a nonaqueous solvent and a polymer material. The solid electrolyte can be prepared by, for example, dissolving an electrolyte in a polymer material, followed by solidifying the resultant solution. Further, the inorganic solid electrolyte includes, for example, a solid material having a lithium ionic conductivity.

It is desirable to use cyclic carbonates such as ethylene carbonate (EC) and propylene carbonate (PC) as the nonaqueous solvent. It is also desirable to use a nonaqueous solvent containing mainly a mixed solvent consisting of a cyclic carbonate and a nonaqueous solvent (hereinafter referred to as a second nonaqueous solvent) having a viscosity lower than that of the cyclic carbonate.

The second nonaqueous solvent includes, for example, a linear carbonate, a cyclic ether, a linear ether, ester and nitrile. The linear carbonate noted above includes, for example, dimethyl carbonate, methyl ethyl carbonate, and diethyl carbonate. The cyclic ether noted above includes, for example, tetrahydrofuran and 2-methyl tetrahydrofuran. The linear ether noted above includes, for example, dimethoxy ethane and diethoxy ethane. The ester noted above includes, for example, γ-butyrolactone, methyl propionate and ethyl propionate. Further, the nitrile noted above includes, for example, acetonitrile.

The electrolyte includes, for example, lithium salts including, for example, lithium hexafluoro phosphate ($LiPF_6$), lithium tetrafluoro borate ($LiBF_4$), lithium hexafluoro arsenate ($LiAsF_6$), lithium perchlorate ($LiClO_4$), and lithium trifluoro metasulfonate ($LiCF_3SO_3$). Particularly, it is desirable to use lithium hexafluoro phosphate ($LiPF_6$) and lithium tetrafluoro borate ($LiBF_4$) as the electrolyte.

The polymer material includes, for example, a homopolymer such as polyacrylonitrile, polyacrylate, polyvinylidene fluoride (PVdF) and polyethylene oxide (PECO). It is also possible to use a copolymer between the monomer forming the homopolymer noted above and another monomer.

The inorganic solid electrolyte includes, for example, a lithium-containing ceramic material such as $Li_3N$ and $Li_3PO_4$—$Li_2S$—$SiS_2$ glass.

It is desirable for a separator described herein later to be interposed between the positive electrode and the negative electrode described above. Incidentally, it is possible for a film of the gel-like electrolyte, the solid electrolyte or the inorganic solid electrolyte described above to be interposed between the positive electrode and negative electrode in place of the separator.

4) Separator:

The separator, which serves to prevent the positive electrode and the negative electrode from being brought into mutual contact, can be formed of an insulating material. Further, the insulating material that is shaped to permit the migration of the electrolyte between the positive electrode and the negative electrode is used as the separator. To be more specific, it is possible to use, for example, a synthetic resin unwoven fabric, a polyethylene porous film or a polypropylene porous film as the separator.

FIG. 1 schematically shows the construction of a cylindrical nonaqueous electrolyte secondary battery according to one embodiment of the nonaqueous electrolyte secondary battery of the present invention. To be more specific, FIG. 1 is a cross sectional view, partly broken away, schematically showing the construction of the cylindrical nonaqueous electrolyte secondary battery.

As shown in the drawing, an insulator 2 is arranged at the bottom portion of a cylindrical case 1 made of stainless steel. An electrode group 3 is arranged inside the case 1. The electrode group 3 is prepared by spirally winding a laminate structure including a positive electrode 4, a negative electrode 6 and a separator 5 interposed between the positive electrode 4 and the negative electrode 6 such that the separator 5 is positioned to form the outermost layer of the electrode group 3.

A nonaqueous electrolyte is loaded inside the case 1. An insulating paper sheet 7 having an open portion formed in the central portion is arranged above the electrode group 3 housed in the case 1. An insulating sealing plate 8 is arranged in an upper open portion of the case 1. The insulating sealing plate 8 is fixed to the case 1 by caulking inward the case 1 in the vicinity of the upper open portion. A positive electrode terminal 9 is fitted in the center of the insulating sealing plate 8. A positive electrode lead 10 is electrically fixed at one end to the positive electrode 4 and at the other end to the positive electrode terminal 9. Further, the negative electrode 6 is electrically connected to the case 1 acting as a negative electrode terminal via a negative electrode lead (not shown).

The nonaqueous electrolyte secondary battery shown in FIG. 1 comprises the cylindrical case 1. However, the nonaqueous electrolyte secondary battery of the present invention is not limited to the cylindrical nonaqueous electrolyte secondary battery. To be more specific, the nonaqueous electrolyte secondary battery of embodiments of the present invention also includes a flat type secondary battery, a prismatic shaped secondary battery, a coin-shaped secondary battery, a button type secondary battery, a sheet-like secondary battery, a laminate type secondary battery, and a large secondary battery mounted to, for example, an electric automobile. Also, the electrode group housed in the case of the secondary battery is not limited to the electrode group of the spiral type. It is also possible for the electrode group to be of, for example, a laminate type.

Examples of the present invention will now be described.

EXAMPLES 1 TO 14

<Preparation of Alloy>

Prescribed amounts of the elements forming the alloys of the compositions shown in Table 1 were mixed, followed by melting the mixture by an induction furnace for about 5 minutes under temperatures higher by about 100° C. than the melting points of the alloys, i.e., under temperatures falling within a range of from about 1200° C. to about 1500° C.

In the next step, alloy sample flakes having a thickness of about 5 to 60 μm were prepared by employing a rapid quenched method in which the roll was rotated at a peripheral speed of about 25 m/s. Then, a heat treatment was applied to the alloy sample flakes thus obtained at about 900° C. for about 1 hour under an Ar gas atmosphere so as to obtain an alloy material. The alloy material thus obtained was subjected to a pulverizing treatment by using a jet mill so as to obtain an alloy powder having an average powder particle diameter of about 1 μm to 30 μm.

The alloy powder thus obtained was analyzed by using an X-ray diffraction apparatus, type number MI8XHF$^{22}$-SRA, manufactured by Mac Science Inc. so as to confirm that the alloy contained $La_3Co_2Sn_7$ type crystal structure.

<Preparation of Negative Electrode>

A slurry was prepared by adding 5% by weight of graphite used as an electrically conductive agent, 3% by weight of acetylene black, which was also used as the electrically conductive agent, 7% by weight of PVdF used as a binder and an N-methylpyrrolidone (NMP) solution to 85% by weight of the allow powder prepared as described above. In the next step, a current collector formed of a copper foil having a thickness of 11 μm was coated with the resultant slurry, followed by the drying process and the pressing process so as to obtain a desired negative electrode.

<Preparation of Positive Electrode>

A slurry was prepared by adding 91% by weight of lithium-cobalt complex oxide ($LiCoO_2$) used as a positive electrode active material, 2.5% by weight of acetylene black used as an electrically conductive agent, 3% by weight of graphite, which was also used as an electrically conductive agent, and 3.5% by weight of polyvinylidene fluoride (PVdF) used as a binder to an N-methylpyrrolidone (NMP) solution, followed by stirring the resultant mixture. Then, a current collector consisting of an aluminum foil having a thickness of 15 μm was coated with the resultant slurry, followed by the drying process and the pressing process so as to obtain a positive electrode having an electrode density of 3.0 g/cm$^3$.

<Preparation of Electrode Group>

A positive electrode, a polyethylene porous film as a separator, a negative electrode, and another separator were laminated one upon the other in the order mentioned so as to form a laminate structure, followed by spirally winding the laminate structure such that the negative electrode was positioned closer to the outermost surface of the wound structure than the positive electrode so as to obtain an electrode group.

<Preparation of Nonaqueous Electrolyte>

A nonaqueous electrolyte was prepared by dissolving lithium hexafluoro phosphate ($LiPF_6$) in a mixed solvent prepared by mixing ethylene carbonate (EC) and methyl ethyl carbonate (MEC) at a mixing ratio by volume of 1:2.

The electrode group and the nonaqueous electrolyte thus prepared were loaded in a case made of stainless steel so as to assemble the cylindrical nonaqueous electrolyte secondary battery constructed as shown in FIG. 1.

EXAMPLES 15 TO 19

Alloys were prepared as in Example 1, except that the compositions of the alloys were changed as shown in Table 1.

Each of the alloys thus prepared was analyzed by using the X-ray diffraction apparatus referred to previously so as to confirm that the alloy contained the $La_3Co_2Sn_7$ type crystal structure.

In the next step, a cylindrical nonaqueous electrolyte secondary battery was assembled as in Example 1, except that each of the alloys thus prepared was used as the negative electrode active material.

COMPARATIVE EXAMPLE 1

A cylindrical nonaqueous electrolyte secondary battery was assembled as in Example 1, except that a mesophase based carbon fiber subjected to a heat treatment at about 3250° C., and having an average fiber diameter of about 10 μm, an average fiber length of about 25 μm, an average layer spacing $d_{(002)}$ of 0.3355 nm, and a specific surface area as determined by the BET method of about 3 m$^2$/g was used as the negative electrode active material.

COMPARATIVE EXAMPLE 2

A cylindrical nonaqueous electrolyte secondary battery was assembled as in Example 1, except that a silicon powder having an average particle diameter of about 10 μm was used as the negative electrode active material.

COMPARATIVE EXAMPLE 3

A cylindrical nonaqueous electrolyte secondary battery was assembled as in Example 1, except that a Li—Sn alloy was used as the negative electrode active material.

COMPARATIVE EXAMPLE 4

A cylindrical nonaqueous electrolyte secondary battery was assembled as in Example 1, except that a CoSn alloy having a hexagonal close-packed structure, which was prepared by a rapid quenched method in which the peripheral speed of the roll was set at about 30 m/s, was used as the negative electrode active material.

COMPARATIVE EXAMPLES 5 TO 7

A cylindrical nonaqueous electrolyte secondary battery was assembled as in Example 1, except that an alloy of $LaSn_3$, $CeSn_3$, or $La_{0.6}Co_{0.4}Sn_3$ was used as the negative electrode active material.

The alloys for Comparative Examples 5 to 7 were analyzed by using the X-ray diffraction apparatus referred to previously. The alloy for each of Comparative Examples 5 and 6 was found to be a single phase alloy consisting of the $LnSn_3$ type crystal phase. On the other hand, the alloy for Comparative Example 7 was found to be a single phase alloy consisting of the $AuCu_3$ type crystal phase.

The nonaqueous electrolyte secondary battery obtained in each of Examples 1 to 19 and Comparative Examples 1 to 7 was subjected to a charge-discharge cycle test under an environment of 25° C., in which the secondary battery was charged for 3 hours to 4.2V under a charging current of 1 A, followed by discharging the secondary battery to 2.7V under a discharging current of 1 A. Table 1 also shows the discharge capacity per unit volume (mAh/cc) for the first charge-discharge cycle, and the capacity retention rate at the 100$^{th}$ charge-discharge cycle on the basis that the discharge capacity for the first charge-discharge cycle was set at 100%.

TABLE 1

| | Composition of negative electrode active material | Discharge capacity per unit volume (mAh/cc) | Capacity retention rate at 100$^{th}$ charge-discharge cycle (%) |
|---|---|---|---|
| Example 1 | $La_3Ni_{1.2}Sn_6$ | 843 | 89 |
| Example 2 | $La_3Ni_{1.2}Sn_8$ | 1432 | 85 |

TABLE 1-continued

| | Composition of negative electrode active material | Discharge capacity per unit volume (mAh/cc) | Capacity retention rate at 100$^{th}$ charge-discharge cycle (%) |
|---|---|---|---|
| Example 3 | La$_3$Ni$_{3.5}$Sn$_6$ | 798 | 90 |
| Example 4 | La$_3$Ni$_{3.5}$Sn$_8$ | 1324 | 92 |
| Example 5 | La$_3$Ni$_2$Sn$_7$ | 1285 | 86 |
| Example 6 | Ce$_3$Ni$_{2.2}$Sn$_{7.3}$ | 1423 | 88 |
| Example 7 | (La$_{0.5}$Ca$_{0.5}$)$_3$(Ni$_{0.8}$Co$_{0.2}$)$_{1.7}$Sn$_7$ | 1215 | 86 |
| Example 8 | (Zr$_{0.5}$Ce$_{0.5}$)$_3$(Ni$_{0.7}$Fe$_{0.3}$)$_{2.8}$(Sn$_{0.5}$Ge$_{0.5}$)$_7$ | 1343 | 93 |
| Example 9 | (La$_{0.7}$Ba$_{0.3}$)$_3$(Ni$_{0.5}$Co$_{0.5}$)$_{3.2}$(Sn$_{0.9}$Si$_{0.1}$)$_7$ | 1264 | 85 |
| Example 10 | (La$_{0.7}$Mg$_{0.3}$)$_3$(Ni$_{0.8}$Ti$_{0.2}$)$_{2.2}$(Sn$_{0.8}$P$_{0.2}$)$_{6.2}$ | 1543 | 83 |
| Example 11 | La$_3$(Ni$_{0.4}$Ti$_{0.3}$V$_{0.3}$)$_{1.5}$(Si$_{0.9}$Sb$_{0.1}$)$_{7.8}$ | 1254 | 88 |
| Example 12 | Ce$_3$(Ni$_{0.7}$Mn$_{0.3}$)$_{2.4}$Si$_{6.8}$ | 1065 | 92 |
| Example 13 | (Ce$_{0.3}$Sr$_{0.7}$)$_3$(Ni$_{0.8}$Zn$_{0.1}$Nb$_{0.1}$)$_2$Sn$_{7.3}$ | 1105 | 93 |
| Example 14 | La$_3$(Ni$_{0.8}$Cr$_{0.2}$)$_{3.3}$Sn$_{7.3}$ | 1342 | 89 |
| Example 15 | (La$_{0.7}$Nd$_{0.3}$)$_3$(Ni$_{0.8}$Ti$_{0.2}$)$_{2.2}$(Sn$_{0.9}$Si$_{0.1}$)$_7$ | 1328 | 88 |
| Example 16 | (Ce$_{0.7}$Pr$_{0.1}$Pm$_{0.1}$Sm$_{0.1}$)$_3$(Ni$_{0.8}$Co$_{0.2}$)$_{2.3}$(Sn$_{0.9}$Si$_{0.1}$)$_7$ | 1232 | 91 |
| Example 17 | (Nd$_{0.9}$Y$_{0.1}$)$_3$(Ni$_{0.9}$Fe$_{0.1}$)$_{1.75}$(Sn$_{0.9}$Si$_{0.1}$)$_7$ | 1257 | 90 |
| Example 18 | (La$_{0.85}$Hf$_{0.05}$Ce$_{0.1}$)$_3$Ni$_2$(Sn$_{0.9}$Si$_{0.1}$)$_7$ | 1304 | 92 |
| Example 19 | (La$_{0.9}$Hf$_{0.1}$)$_3$(Ni$_{0.8}$Cu$_{0.2}$)$_{3.2}$(Sn$_{0.9}$Si$_{0.1}$)$_7$ | 1208 | 89 |
| Comparative Example 1 | C | 498 | 97 |
| Comparative Example 2 | Si | 9800 | 23 |
| Comparative Example 3 | Li—Sn | 3254 | 12 |
| Comparative Example 4 | CoSn | 2830 | 43 |
| Comparative Example 5 | LaSn$_3$ | 3010 | 52 |
| Comparative Example 6 | CeSn$_3$ | 3215 | 57 |
| Comparative Example 7 | La$_{0.6}$Co$_{0.4}$Sn$_3$ | 1765 | 45 |

As shown in Table 1, the secondary battery for each of Examples 1 to 19 exhibited a cycle life longer than that of the secondary battery for each of Comparative Examples 2 to 7 in which an alloy material was used as the negative electrode active material. Also, the secondary battery for each of Examples 1 to 19 was found to have a capacity larger than that of the secondary battery for Comparative Example 1 in which a carbonaceous material was used as the negative electrode active material. In other words, the experimental data given in Table 1 clearly support that the secondary battery comprising an alloy having the La$_3$Co$_2$Sn$_7$ type crystal structure as a negative electrode active material exhibits a high capacity of the alloy and is capable of achieving a long cycle life.

Attentions should be paid to the Sn content of the alloy. It should be noted that the capacity of the secondary battery for Example 2 was found to be larger than that for Example 1, and that the capacity of the secondary battery for Example 4 was found to be larger than that for Example 3. Such being the situation, it is considered reasonable to understand that the capacity of the negative electrode active material is increased with increase in the content y of the component M2 of the alloy represented by formula (1) given previously.

Attentions should also be paid to the Ni content of the alloy. It should be noted that the capacity of the secondary battery for Example 1 was found to be larger than that of the secondary battery for Example 3, and that the capacity of the secondary battery for Example 2 was found to be larger than that of the secondary battery for Example 4. Such being the situation, it is considered reasonable to understand that the capacity of the negative electrode active material can be increased with decrease in the content x of the component M1 of the alloy represented by formula (1) given previously.

The secondary battery for Example 11 comprised an alloy containing Si in an amount of 90 atomic % of the component M2 of the alloy. In this case, the discharge capacity per unit volume was found to be 1254 mAh/cc, and the capacity retention rate at the 100$^{th}$ charge-discharge cycle was found to be 88%. On the other hand, the secondary battery for Example 15 comprised an alloy containing Sn in an amount of 90 atomic % of the component M2 of the alloy. In this case, the capacity retention rate at the 100$^{th}$ charge-discharge cycle was also found to be 88%. However, the discharge capacity per unit volume of the secondary battery for Example 15 was found to be larger than that of the secondary battery for Example 11. When it comes to Example 12, the secondary battery comprised an alloy in which the component M2 was formed of Si alone. In this case, the discharge capacity per unit volume was found to be 1065 mAh/cc, and the capacity retention rate at the 100$^{th}$ charge-discharge cycle was found to be 92%. What should be noted is that the discharge capacity per unit volume for Example 4, which comprised an alloy containing Sn alone as the component M2 and exhibited the same capacity retention rate of 92%, was found to be higher than that for Example 12. It follows that the experimental data clearly support that Sn is advantageous over Si in achieving a good balance between the discharge capacity per unit volume and the charge-discharge cycle life.

Further, the atomic ratio of Ln:M1:M2 was set at 3:2:7 in the nonaqueous electrolyte secondary battery for each of Example 5 and Example 18. In the secondary battery for Example 18, however, other elements were partly substituted for a part of La constituting the component Ln, and another element was partly substituted for Sn constituting the component M2, with the result that the secondary battery for Example 18 was found to be superior to the secondary battery for Example 5 in each of the discharge capacity per unit volume and the capacity retention rate at the 100$^{th}$ charge-discharge cycle. Under the circumstances, it is considered reasonable to understand that the capacity and the cycle life of the secondary battery can be further improved by partly substituting other elements for the basic elements of La, Ni and/or Sn.

As described previously, the negative electrode active material for each of Example 5, Comparative Example 3 and Comparative Example 5 was subjected to the X-ray diffraction analysis. In the measuring stage, the electrode was protected by a polyethylene film in order to maintain an inert atmosphere.

Figure 3:
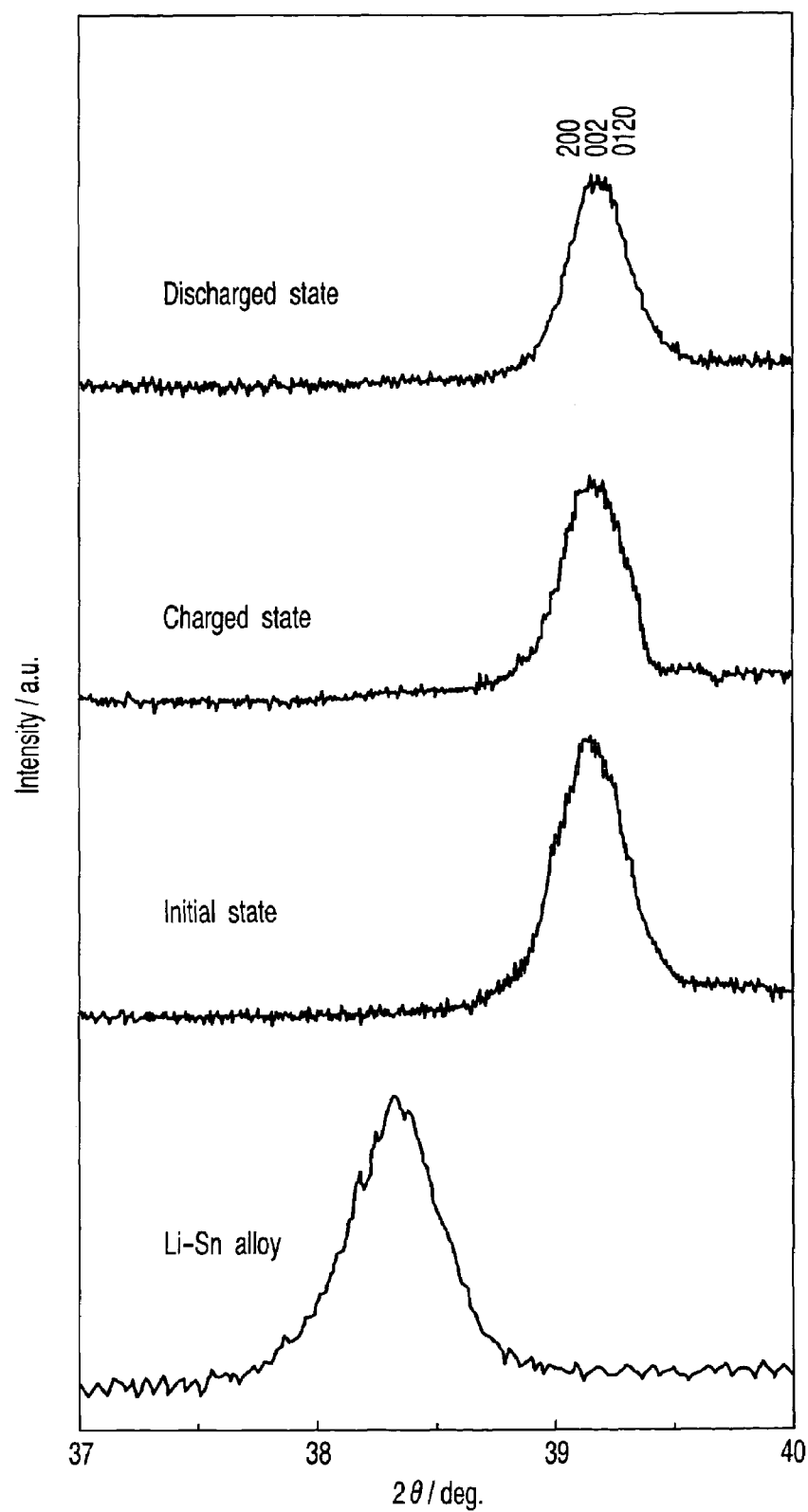
FIG. 3 is an X-ray diffraction pattern of the negative electrode active material under the initial state, the charged state and the discharged state of the nonaqueous electrolyte secondary battery for Example 5 of the present invention.

FIG. 3 shows the X-ray diffraction pattern of the negative electrode active material under the initial state (before charging for the first charge-discharge cycle), under the charged state (after the charging for the first charge-discharge cycle) and under the discharged state (after the discharging for the first charge-discharge cycle) of the nonaqueous electrolyte secondary battery for Example 5. The peaks shown in the upper three stages of FIG. 3 denote the peaks derived from the $La_3Co_2Sn_7$ crystal structure, i.e., the peaks on the 200 plane, the 002 plane and the 0120 plane. FIG. 3 also shows in the lowermost stage the peak of the Li—Sn alloy for Comparative Example 3.

As shown in FIG. 3, the peaks are not changed nor displaced in accordance with the progress of the charge-discharge cycle of the nonaqueous electrolyte secondary battery. In other words, the experimental data given in FIG. 3 support that the absorption-release reaction of lithium that is performed by the alloy having the $La_3Co_2Sn_7$ crystal structure is not accompanied by the change and the expansion-shrinkage of the crystal structure.

It should also be noted that a peak in the vicinity of 38.3°, which is derived from the alloying reaction between Li and Sn is not observed in the X-ray diffraction pattern after the charging. Such being the situation, it is considered reasonable to understand that the Li absorption-release reaction performed by the alloy having the $La_3Co_2Sn_7$ crystal structure is an intercalation reaction.

Figure 4:
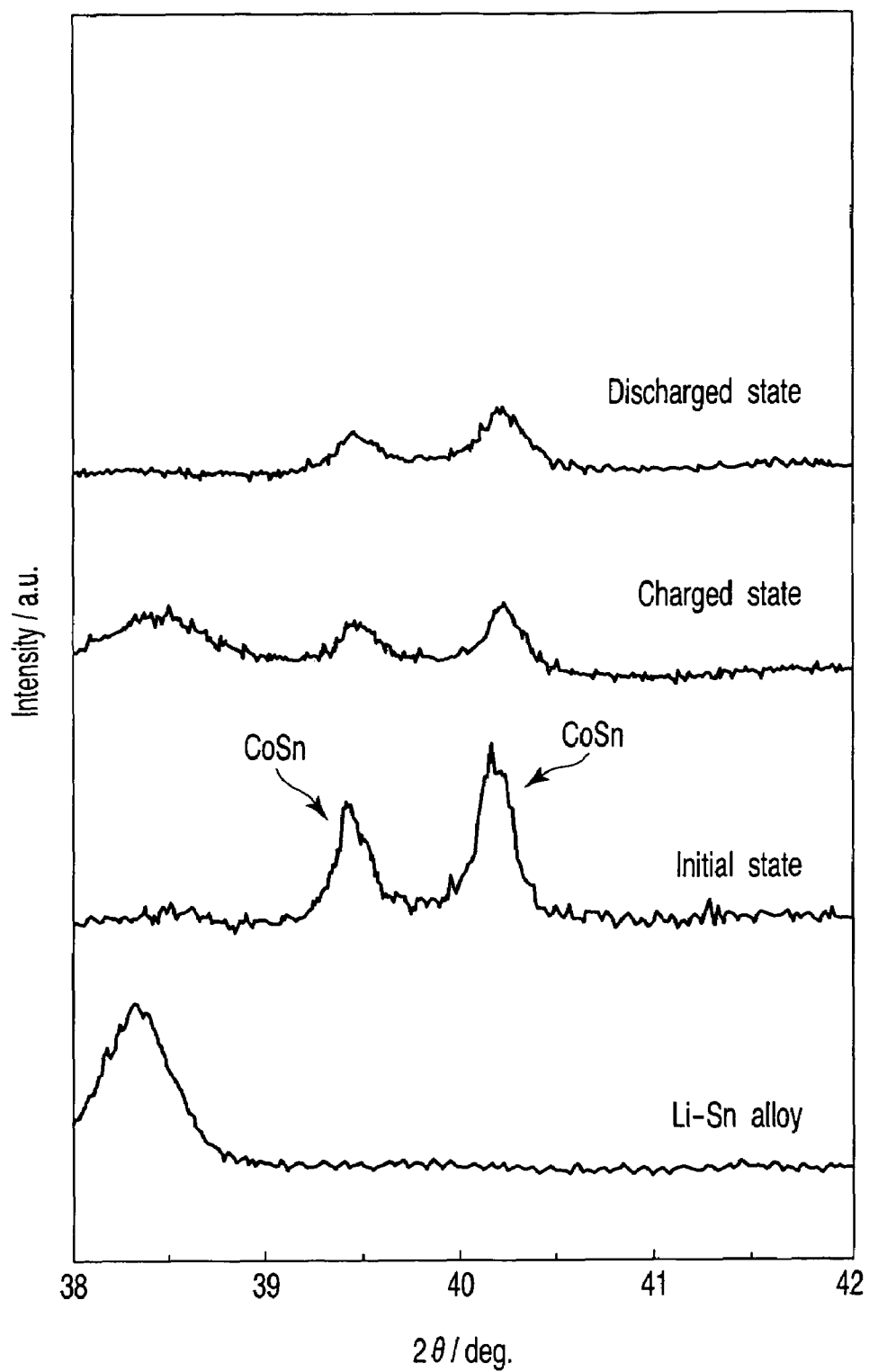
FIG. 4 is an X-ray diffraction pattern of the negative electrode active material under the initial state, the charged state and the discharged state of the nonaqueous electrolyte secondary battery for Comparative Example 4.

On the other hand, FIG. 4 shows the X-ray diffraction pattern of the negative electrode active material under the initial state (before charging for the first charge-discharge cycle), under the charged state (after the charging for the first charge-discharge cycle) and under the discharged state (after the discharging for the first charge-discharge cycle) of the nonaqueous electrolyte secondary battery for Comparative Example 4. The peaks shown in the upper three stages of FIG. 4 denote the peaks derived from CoSn. FIG. 4 also shows in the lowermost stage the peak of the Li—Sn alloy for Comparative Example 3.

As shown in FIG. 4, the peaks derived from CoSn are decreased in accordance with the progress of the charge-discharge of the nonaqueous electrolyte secondary battery. Also, a peak derived from the alloying reaction between Li and Sn is observed under the charged state. In other words, the experimental data given in FIG. 4 support that the absorption-release reaction of lithium performed by CoSn is an alloying reaction.

It is known to the art that the generation of the Li—Sn alloy during the charge-discharge stage brings about a marked change in the volume of the negative electrode active material. Also, the Li—Sn alloy has a low melting point so as to bring about a thermal runaway of the secondary battery. Under the circumstances, the cycle life of the secondary battery for Comparative Example 4 was considered to have been shortened.

Figure 5:
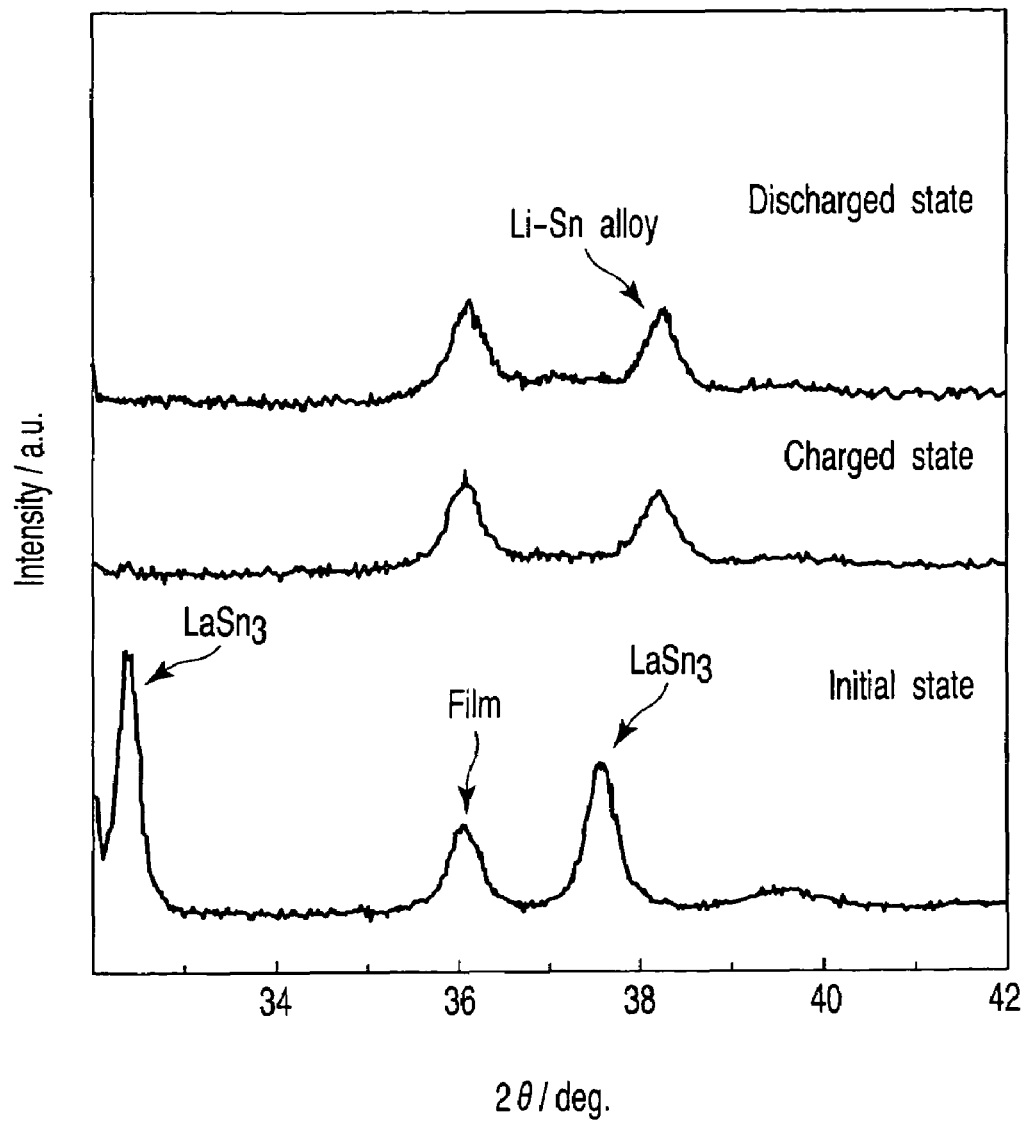
FIG. 5 is an X-ray diffraction pattern of the negative electrode active material under the initial state, the charged state and the discharged state of the nonaqueous electrolyte secondary battery for Comparative Example 5.

On the other hand, FIG. 5 shows the X-ray diffraction pattern of the negative electrode active material under the initial state (before charging for the first charge-discharge cycle), under the charged state (after the charging for the first charge-discharge cycle) and under the discharged state (after the discharging for the $50^{th}$ charge-discharge cycle) of the nonaqueous electrolyte secondary battery for Comparative Example 5.

As apparent from FIG. 5, the peak derived from $LaSn_3$ was found to have disappeared after the first charging of the nonaqueous electrolyte secondary battery, and a peak derived from the alloying reaction between Li and Sn was observed. A peak derived from the alloying reaction between Li and Sn was also observed after the discharging for the $50^{th}$ charge-discharge cycle. This implies the collapse of the crystal structure. It follows that the Li absorption-release reaction performed by $LaSn_3$ is an alloying reaction. This is also considered to be the case with Comparative Examples 6 and 7.

Incidentally, the peak in the vicinity of 36° was derived from the polyethylene film used for putting the electrode under an inert atmosphere.

As described above, according to one embodiment of the present invention, it is possible to provide a nonaqueous electrolyte secondary battery comprising a negative electrode active material that contains an alloy material and having a long cycle life.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:
   a case;
   a nonaqueous electrolyte provided in the case;
   a positive electrode provided in the case and capable of absorbing-releasing Li; and
   a negative electrode provided in the case and comprising an alloy that has a $La_3Co_2Sn_7$ type crystal structure.

2. The nonaqueous electrolyte secondary battery according to claim 1, wherein the alloy has a composition represented by formula (1) given below:

$$Ln_3M1_xM2_y \quad (1)$$

where Ln denotes at least one element selected from elements having an atomic radius falling within a range of from $1.6 \times 10^{-10}$ m to $2.2 \times 10^{-10}$ m, M1 denotes at least one element selected from the group consisting of Ti, V, Cr, Mn, Fe, Co, Ni, Cu, Zn and Nb, M2 denotes at least one element selected from the group consisting of Si, P, Ge, Sn and Sb, x is $1.2 \leq x \leq 3.5$, and y is $6.0 \leq y \leq 8.0$.

3. The nonaqueous electrolyte secondary battery according to claim 2, wherein Ln in formula (1) denotes at least one element selected the group consisting of La, Ce, Ba, Sr, Zr, Ca and Mg, and M1 denotes at least one element selected from the group consisting of Ti, V, Cr, Mn, Fe, Co, Ni, Zn and Nb.

4. The nonaqueous electrolyte secondary battery according to claim 2, wherein x in formula (1) is $1.5 \leq x \leq 3.0$.

5. The nonaqueous electrolyte secondary battery according to claim 2, wherein y in formula (1) is $6.5 \leq y \leq 7.8$.

6. The nonaqueous electrolyte secondary battery according to claim 2, wherein M1 in formula (1) includes a first element consisting of Co and/or Ni and at least one element selected from the group consisting of Ti, V, Cr, Mn, Fe, Cu, Zn and Nb.

7. The nonaqueous electrolyte secondary battery according to claim 6, wherein an amount of the first element is not smaller than 40 atomic % and smaller than 100 atomic % based on an amount of the component M1 of the alloy.

8. The nonaqueous electrolyte secondary battery according to claim 2, wherein M2 in formula (1) includes a second element consisting of Si and/or Sn and at least one element selected from the group consisting of P, Ge, and Sb.

9. The nonaqueous electrolyte secondary battery according to claim 8, wherein an amount of the second element is not smaller than 50 atomic % and smaller than 100 atomic % based on an amount of the component M2 of the alloy.

10. The nonaqueous elecirolyte secondary battery according to claim 2, wherein Ln in formula (1) includes La and at least one element selected from the group consisting of Ce, Pr, Nd, Pm, Sm, Mg, Ca, Sr, Ba, Y, Zr and Hf.

11. The nonaqueous electrolyte secondary battery according to claim 1, wherein the nonaqueous electrolyte is in the form of a liquid, a gel or a solid.

12. A nonaqueous electrolyte secondary battery, comprising:
a case;
nonaqueous electrolyte provided in the case;
a positive electrode provided in the case and capable of absorbing-releasing Li;
a negative electrode provided in the case and comprising an alloy that has a $La_3Co_2Sn_7$ type crystal structure; and
a separator provided between the negative electrode and the positive electrode and holding the nonaqueous electrolyte.

13. The nonaqueous electrolyte secondary battery according to claim 12, wherein the alloy has a composition represented by formula (1) given below:

$$Ln_3M1_xM2_y \qquad (1)$$

where Ln denotes at least one element selected from elements having an atomic radius falling within a range of from $1.6 \times 10^{-10}$ m to $2.2 \times 10^{-10}$ m, M1 denotes at least one element selected from the group consisting of Ti, V, Cr, Mn, Fe, Co, Ni, Cu, Zn and Nb, M2 denotes at least one element selected from the group consisting of Si, P, Ge, Sn and Sb, x is $1.2 \leq x \leq 3.5$, and y is $60 \leq y \leq 80$.

14. The nonaqueous electrolyte secondary battery according to claim 13, wherein x in formula (1) is $1.5 \leq x \leq 3.0$, and y in formula (1) is $6.5 \leq y \leq 7.8$.

15. The nonaqueous electrolyte secondary battery according to claim 13, wherein M1 in formula (1) includes a first element consisting of Co and/or Ni and at least one element selected from the group consisting of Ti, V, Cr, Mn, Fe, Cu, Zn and Nb, and M2 in formula (1) includes a second element consisting of Si and/or Sn and at least one element selected from the group consisting of P, Ge, and Sb.

16. The nonaqueous electrolyte secondary battery according to claim 15, wherein an amount of the first element is not smaller than 40 atomic % and smaller than 100 atomic % based on an amount of the component M1 of the alloy, and an amount of the second element is not smaller than 50 atomic % and smaller than 100 atomic % based on an amount of the component M2 of the alloy.

17. The nonaqueous electrolyte secondary battery according to claim 13, wherein Ln in formula (1) includes La and at least one element selected from the group consisting of Ce, Pr, Nd, Pm, Sm, Mg, Ca, Sr, Ba, Y, Zn and Hf 18. The nonaqueous electrolyte secondary battery according to claim 2, wherein Ln is La, Ml is Ni, and M2 is Sn.

19. The nonaqueous electrolyte secondary battery according to claim 13, wherein Ln is La, M1 is Ni, and M2 is Sn.

* * * * *